April 20, 1954      J. C. SULE      2,676,222
ELECTRICAL SWITCH OPERABLE BY THE FIELD OF A MOTOR
Filed May 4, 1949
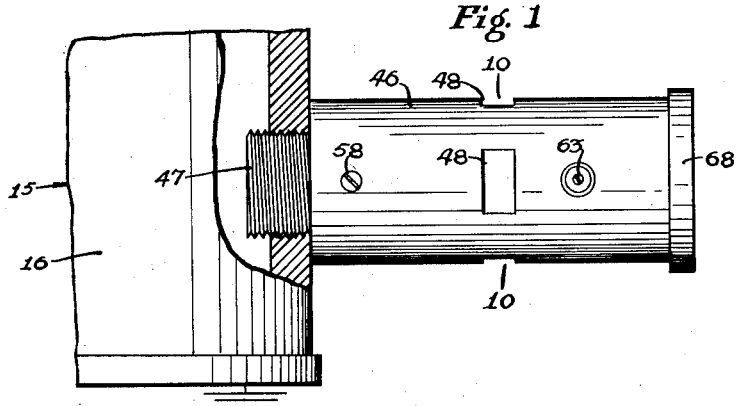
Fig. 1
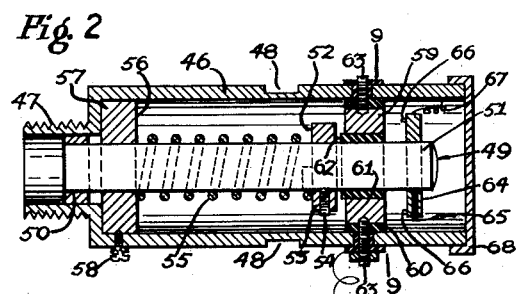
Fig. 2
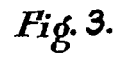
Fig. 3.
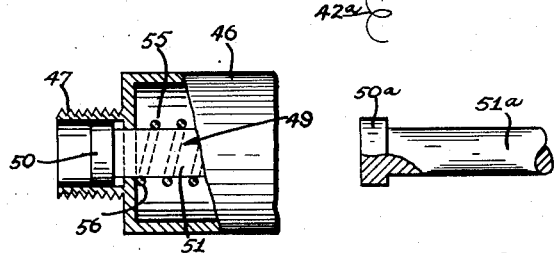
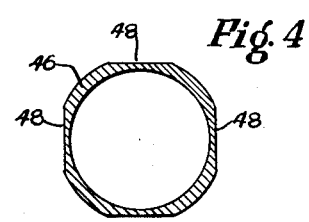
Fig. 5.      Fig. 6.
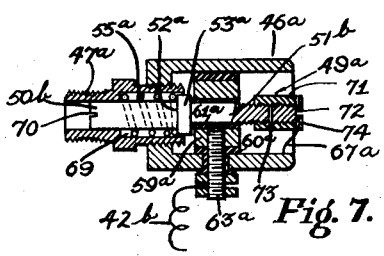
Fig. 7.
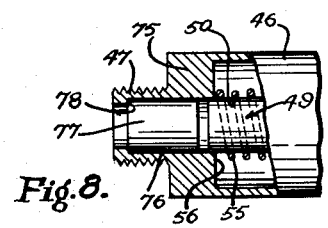
Fig. 8.
INVENTOR.
John C. Sule
BY
W. W. Williamson
Atty.

Patented Apr. 20, 1954

2,676,222

UNITED STATES PATENT OFFICE 2,676,222

ELECTRICAL SWITCH OPERABLE BY THE FIELD OF A MOTOR

John C. Sule, Berlin, N. J.

Application May 4, 1949, Serial No. 91,276

5 Claims. (Cl. 200—87)

My invention relates to a new and useful electrical indicator or signal especially adapted for indicating impairments in electrical apparatus such as motors. This indicator or signal is particularly devised for producing a signal when the rotating armature contacts a field pole or element in a motor, generator or the like to indicate that the apparatus is impaired to such an extent that it is not functioning properly and may result in considerable damage. A device of this character serves a long felt want in connection with automobile engine starters because it will immediately indicate whether the failure of the starter motor to function is caused by the rotating armature contacting a field element due to a worn bearing or shaft or both.

An object of the invention is to construct an exceedingly simple and effective signal or indicator actuator associated with an electrical apparatus, said indicator to be influenced by magnetic force within the electrical apparatus for closing an electrical circuit including a signal means, either of an audible or visible type.

Another object of the present invention is to provide a signal or indicator actuator comprising a housing having a combined armature and contact member slidably mounted therein, normally maintained in an inoperative or neutral position by a spring, and the contact portion of said member being associated with a stationary contact for closing a signal circuit when the member is operated by a magnetic force set up in an electrical apparatus.

Further objects of the invention are: to provide unique means for insulating the stationary contact from the housing and sliding member of the actuator; to provide various means constituting a fixed shoulder as an abutment for the spring; to construct the armature part of the sliding member as an integral or separate portion of the balance of said member; to provide threaded means on the body of the housing to be screwed into a hole in the casing of an electrical apparatus for mounting the actuator on said apparatus; and to form said mounting means from a pipe fitting or nipple.

A still further object of this invention is to provide a separate shunt field core loosely slidably mounted in a portion of the actuator housing in endwise alignment with the sliding member adjacent the outer end of the armature portion of said sliding member to cause the "pull" of magnetic forces to be directed axially of the sliding member.

With the above and other objects in view this invention consists of the details of construction and combination of elements hereinafter set forth and then designated by the claims.

In order that those skilled in the art to which this invention appertains may understand how to make and use the same, I will describe its construction in detail, referring by numerals to the accompanying drawing forming a part hereof, in which—

Fig. 1 is a view of an actuator having a sliding member and illustrating it mounted on the motor casing of an engine starter a part of which is shown partly in elevation and partly in section.

Fig. 2 is a longitudinal section of the actuator shown in Fig. 1 with the stem portion of the sliding member illustrated in elevation.

Fig. 3 is a section on the line 9—9 of Fig. 2 of the housing, the stem of the sliding member, the stationary contact and the contact and the insulating means.

Fig. 4 is a section of the housing on the line 10—10 of Fig. 1.

Fig. 5 is a fragmentary side elevation of the actuator with portions broken away and shown in section to illustrate another way of providing an abutment for the spring.

Fig. 6 is a fragmentary sectional elevation of a sliding member where the armature part and stem are integral.

Fig. 7 is a longitudinal section of an actuator with the body and nipple made of separate parts.

Fig. 8 is a fragmentary sectional elevation of an actuator having a floating shunt field core associated with the actuator armature.

In carrying out my invention as herein embodied, 15 represents an electrical apparatus which can be tested for certain impairments by my device. The apparatus illustrated is a starter for internal combustion engines, particularly such as used in automobiles, airplanes and the like, and such apparatus includes an electric motor with which I am especially concerned, although the invention is not confined to use with motors only. The invention can be employed in connection with generators and other electrical appliances having field elements and an armature, one rotatable relative to the other.

It is common knowledge that an engine starter, such as shown herein, includes a motor comprised of the casing 16 and a rotating armature secured to a shaft 17. Often the shaft 17 or its bearing bushings wear to such an extent that the armature engages the field elements and prevents the proper flow of current so that the motor will not operate. Usually it is impossible to ascertain that this condition exists without dismantling the entire apparatus although when such a condition does occur and the field elements are energized a magnetic force is set up. My invention makes use of this magnetic force to operate a signal actuator and thereby close a signal circuit when the motor circuit is closed.

The motor circuit includes a source of current, such as a battery 18, one side of which is connected to one side of the motor field elements, as through ground connections and the other side of said source of current is connected by a conductor with one side of a starter switch. The other side of said starter switch is connected by a conductor with the other side of the motor field elements. When the switch is closed a circuit is completed from the source of current through the conductors, starter switch, the motor field elements and through the ground connections back to the source of current.

The signal actuator which is associated with a motor includes the housing 46 of tubular formation of any desirable cross sectional configuration and provided at the base end with a threaded integral nipple 47. As a variation of this construction the nipple 47a, Fig. 7, may be a separate element, like a small pipe fitting, and mounted in the base end of housing 46a. Where the body is round flats 48 may be formed on the exterior thereof so that said body can be readily gripped by a wrench.

A movable or sliding member 49 is mounted to reciprocate longitudinally within the housing and includes an armature portion 50 and a wing portion 51 in the form of a stem. The armature portion 50 may be a separate ring mounted on one end of the stem-like wing portion or said armature portion shown at 50a, Fig. 6, may be formed as an integral part of the stem-like wing portion 51a, or the armature and stem-like wing portions may be of approximately the same diameter as illustrated in Fig. 8.

The armature portion of the movable or sliding member 49 projects any desirable distance into the bore of the nipple 47 so as to be close to the field elements of the electrical apparatus 15, Fig. 1, when the actuator is mounted on the casing 16, as by screwing the nipple into a hole in said casing.

On the sliding movable member 49, a suitable distance from the armature portion, is a shoulder 52 provided in any desirable manner. For purposes of illustration the shoulder in Fig. 2 is shown as one end face of a ring 53 secured on the movable member, particularly the stem-like wing portion, by a fastening device 54, such as a set screw.

The movable member 49 is urged in a direction which retracts the armature portion of said member by a spring 55 engaging the shoulder 52 and an opposed shoulder 56 adjacent the nipple and comprised of a wall of the housing, as in Figs. 5 and 8, or a filler ring 57, Fig. 2, mounted inside of the housing and, if desirable, said filler ring may be removably held in place by a fastening device 58, such as a set screw.

Within the housing 46 beyond the position of the stop ring 53 is located an electric conductive contact 59 in the form of a ring insulated from the housing 46 by an outer ring or band 60 of insulating material and also insulated from the movable member by an inner ring or band 61 of insulating material. The movable member 49 slides through the inner insulating ring or band 61 and the inner end of said ring 61 projects as an annular lip 62 beyond the adjacent face of the contact 59 to prevent engagement of the stop 53 with said contact 59 which would cause a false operation.

The contact 59 and the insulating elements associated therewith are stationary relative to one another and the entire unit is maintained in a fixed position within the housing by one or more terminal posts 63, preferably in the form of screws, projected through and insulated from the housing 46, through the insulating ring or band 60 and into the contact 59.

On the movable member 49 as a unitary part thereof is an electric conductive cross-head 64 which may be in the form of a metal ring held in fixed position by a fastening device 65, such as a set screw. The cross-head is positioned beyond the contact 59 outward of the housing and may have teats 66 projecting from the surface facing the contact 59 which they are to engage for completing an electrical circuit under certain conditions. These teats may be of a metal the same as or different from that of the cross-head and integral with or separate from the latter.

While there is good electrical conductivity between the cross-head and the casing of the electrical appliance or motor, through the stem-like wing portion of the movable member, its spring, the housing and component parts, I desire, in some instances, to make a direct electrical connection between the cross-head and the housing. To accomplish this I attach the ends of a very flexible conductor 67 to the cross-head and a wall of the housing.

The outer open end of the housing 46 may be closed by a cap 68.

As illustrated in Fig. 7, the nipple 47a is a separate element, similar to a small pipe fitting, mounted in a hole in the closed end of the housing 46a and said nipple has a counterbore in its inner end to provide a socket 69. In this instance the movable member 49a includes the armature portion 50b with a screw driver slot 70, an integral stop collar or ring 53, to provide the shoulder 52a, and the stem-like wing portion 51b on which is screw threaded the head 71 having a screw driver slot 72. By the use of two screw drivers the head 71 can be firmly tightened on the balance of the movable member. After the head is in place it can be secured by a pin 73.

The head 49a is designed to engage the contact 59a between the insulations 60a and 61a, the construction of which is the same as the similar structure described with relation to Fig. 2. The movable member is urged in a direction to retract the actuator portion 50b by the spring 55a seated against the bottom of the socket 69 in the nipple and resting against the shoulder 52a. This action also urges the head 49a away from and out of engagement with the contact 59a.

A terminal 63a is projected through and insulated from a wall of the housing and also projected through the insulation band 60a and into the contact 59a. This provides an electrical connection between the contact 59a within the housing and the exterior of the latter. A conductor 42b, which is a part of the signal circuit, is attached to the terminal 63a. To provide a positive electrical bond between the head 49a and the housing 46a, a very flexible wire 67a has one end attached to the housing and the other to the movable member or its head. A convenient way to secure the wire to the movable member is to insert an end of said wire in a hole 74 in a diameter of the head adjacent its outer end and clamp the wire between the movable member and said head.

In Fig. 8 the base wall 75 of the housing is extra thick so that with the armature portion projecting into the bore 76 leading to the nipple, said armature portion will be outside of outer circumference of the appliance casing 16. Within the bore 76 between the terminal end of the nipple 47 and the armature portion of the movable member is loosely and slidably mounted a separate independent shunt field core 77. Said core is in endwise alignment with the movable member and is retained against accidental displacement by an internal shoulder 78 on the nipple 47. It has been discovered that this construction causes shunt field core 77 to be influenced by a magnetic force from any direction and then direct the "pull" axially of the armature portion 50 of the movable member 49 so there is practically no chance of the movable member being tilted or cocked to one side which might cause a binding action between the parts.

The actuator with the sliding movable member is hooked into the electric signal circuit, therefore, when an impairment occurs in the appliance which will cause electro magnetism to be set up, the armature portion of the movable sliding member will be influenced and drawn outward. This will cause the cross-head or head to engage the contact member and complete an electric circuit through the signal means whenever the circuit of an impaired appliance is closed.

In practice, if the rotating element of the motor is in good condition and the starter switch is closed a circuit is completed through the source of current and said motor, to operate the latter. During this time the sliding member 49 of the signal actuator remains in the retracted, inoperative or neutral position so that a signal means, such as an electric lamp, does not function. Should any parts of the motor become worn or impaired to such an extent that the rotating element or armature contacts the stationary element or field pieces of the motor, and the starter switch is closed, the motor will not function properly, if at all, and an electro-magnetic force will be set up.

The magnetic force thus established will effect the actuator armature portion of the sliding member 49 and draw said actuator armature portion outwardly, relative to the actuator housing, causing the cross-head 64 to engage the contact 59. This completes a signal or branch circuit from one side of the source of current, through the conductors, starter switch, the signal means, contact terminal 63, contact member 59, the wire 67 or stem 51, housing 46, motor casing 16 and the ground connections to the other side of the source of current. Upon completion of the signal circuit, the signal means will function to indicate impairment of the motor parts.

From the foregoing it will now be apparent that the primary feature, although not restricted thereto, is the provision of signal or indicator means to function when an automobile motor is hard to start or cannot be started at all due to low bearings and the starter motor in consuming practically all of the storage battery voltage because of an electro-magnetic short. When the armature is rubbing against the field pole, the field tends to hold the armature from turning and when this occurs it robs the voltage from the storage battery thereby throwing the entire electrical system out of order. Whenever such conditions do occur my device will indicate that the trouble is in the starter motor and therefore a person does not have to waste time and effort in trying to locate it.

Of course I do not wish to be limited to the exact details of construction herein shown and described as these may be varied within the scope of the appended claims without departing from the spirit of my invention.

Having described my invention what I claim as new and useful is:

1. A signal actuator comprising a tubular housing having a hollow nipple for attachment to the casing of an electric appliance of the motor type, a movable member slidably mounted in said housing and including an armature portion projecting into the bore of the hollow nipple and a wing portion round in cross section, said movable member normally being in a retracted position and adapted to be moved forwardly by a magnetic force set up in the electric appliance due to an impairment and when said appliance is electrically energized, a shoulder within the housing adjacent the nipple, a second shoulder provided on the wing portion of the movable member, a spring mounted between said shoulders to constantly urge said movable member towards its retracted position, a ring shaped contact within the housing surrounding the wing portion of said movable member and spaced from the latter, an insulating band between said contact and the housing, terminals for securing said contact within the housing and insulated from the latter and extending outside of the housing for the connection of a conductor in circuit with the contact, and an electric conductive cross-head fixed to the round wing portion of the movable member on the side of the contact opposite the location of the spring whereby when said movable member is propelled forwardly said cross-head will engage the movable member to close an electric circuit.

2. The structure defined in claim 1 wherein the cross-head is electrically connected with the housing by a thin flexible conductor.

3. The structure defined in claim 1 wherein the cross-head has teats projecting from the surface facing the contact to engage the latter as the movable member is propelled forwardly.

4. The structure defined in claim 1 in combination with a band of insulating material mounted on the inner circumference of the ring shaped contact to guide the round wing of the movable member.

5. The structure according to claim 4 wherein the end of the insulating material facing the shoulder on the wing portion of the movable member projects beyond the contiguous face of the contact.

References Cited in the file of this patent

UNITED STATES PATENTS

| Number | Name | Date |
|---|---|---|
| 996,874 | Moak | July 4, 1911 |
| 1,001,152 | Lawrence | Aug. 22, 1911 |
| 1,038,254 | Wilson | Sept. 10, 1912 |
| 1,142,866 | Wilson | June 15, 1915 |
| 1,170,360 | Taylor | Feb. 1, 1916 |
| 1,193,537 | Girardeau | Aug. 8, 1916 |
| 1,235,033 | James | July 31, 1917 |
| 1,588,155 | Anderson | June 8, 1926 |
| 1,686,293 | Nye | Oct. 2, 1928 |
| 1,696,107 | Bierbower | Dec. 18, 1928 |
| 1,793,858 | Lake | Feb. 24, 1931 |
| 2,042,915 | Twist | June 2, 1936 |
| 2,132,188 | Rockett et al. | Oct. 4, 1938 |
| 2,138,430 | Rudd | Nov. 29, 1938 |
| 2,297,402 | Garber | Sept. 29, 1942 |
| 2,342,527 | Bucklen | Feb. 22, 1944 |
| 2,443,338 | Berry | June 15, 1948 |

FOREIGN PATENTS

| Number | Country | Date |
|---|---|---|
| 175,311 | Great Britain | Feb. 13, 1922 |